United States Patent [19]

Kolb et al.

[11] 4,350,367
[45] Sep. 21, 1982

[54] ROLL BAR FOR VEHICLES, ESPECIALLY MOTOR VEHICLES

[75] Inventors: Eugen Kolb, Stuttgart; Rainer Srock, Leonberg, both of Fed. Rep. of Germany

[73] Assignee: Ing. h.c.F. Porsche Aktiengesellschaft, Stuttgart, Fed. Rep. of Germany

[21] Appl. No.: 140,414

[22] Filed: Apr. 14, 1980

[30] Foreign Application Priority Data

Apr. 20, 1979 [DE] Fed. Rep. of Germany ....... 2916010

[51] Int. Cl.³ .............................................. B60R 21/02
[52] U.S. Cl. ..................................... 280/756; 296/102
[58] Field of Search ...................... 296/102, 210, 104; 280/756, 784; 52/731, 797

[56] References Cited

U.S. PATENT DOCUMENTS

| | | | |
|---|---|---|---|
| 1,997,876 | 4/1929 | Sheldon | 189/37 |
| 2,901,062 | 8/1959 | Rice | 52/797 |
| 3,102,611 | 9/1963 | Mote | 52/797 |
| 3,647,258 | 3/1972 | Porsche et al. | 296/102 |
| 3,656,803 | 4/1972 | Brown | 296/102 |
| 3,985,386 | 10/1976 | Woods | 296/102 |
| 4,023,838 | 5/1977 | Sabec | 296/102 |

FOREIGN PATENT DOCUMENTS

| | | | |
|---|---|---|---|
| 1808786 | 6/1970 | Fed. Rep. of Germany | 280/756 |
| 343238 | 9/1904 | France | 296/187 |
| 365150 | 4/1908 | France | 296/187 |
| 1539482 | 9/1968 | France | 280/756 |
| 2114490 | 6/1972 | France | 280/756 |
| 1196742 | 7/1970 | United Kingdom | 280/756 |

*Primary Examiner*—David M. Mitchell
*Attorney, Agent, or Firm*—Craig and Antonelli

[57] ABSTRACT

A roll bar for vehicles, especially motor vehicles, comprises two vertical segments mounted on opposite sides of the body which are connected together by at least one cross member. Each segment comprises, according to a preferred embodiment, two elements of the same profile which withstand deformations that increase the section modulus, said elements being formed by roll sections assembled to form a hollow member and connected to one another by welding, gluing, or the like. According to a particularly advantageous arrangement, each segment, as viewed in cross section, comprises two tubular structures that are joined to a common rib.

14 Claims, 6 Drawing Figures

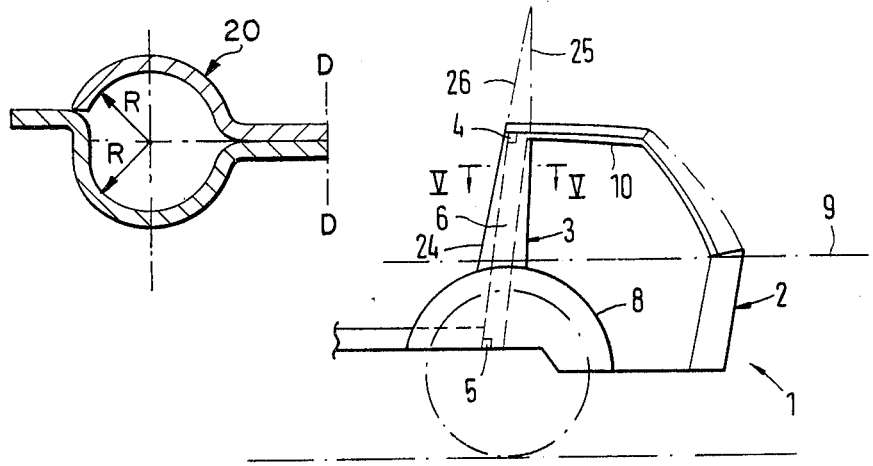
Fig. 1
Fig. 6
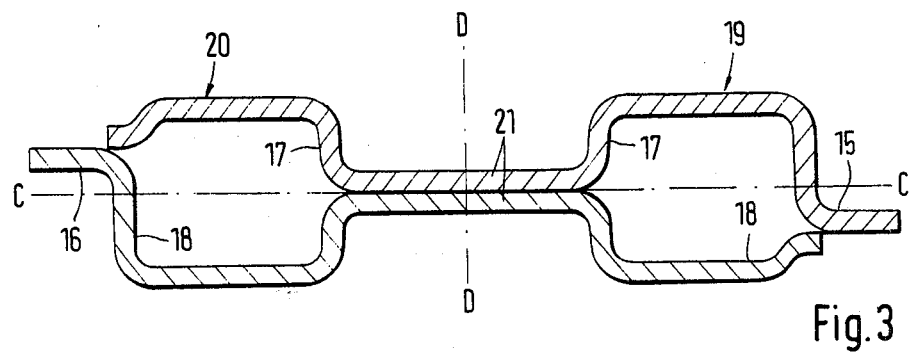
Fig. 3
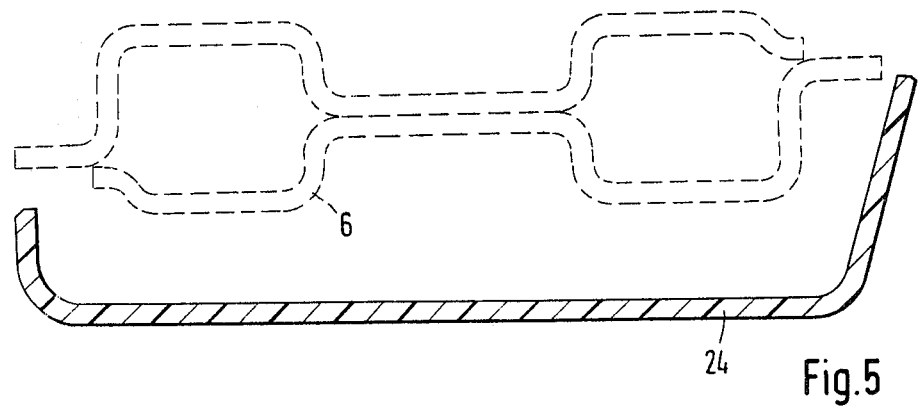
Fig. 5

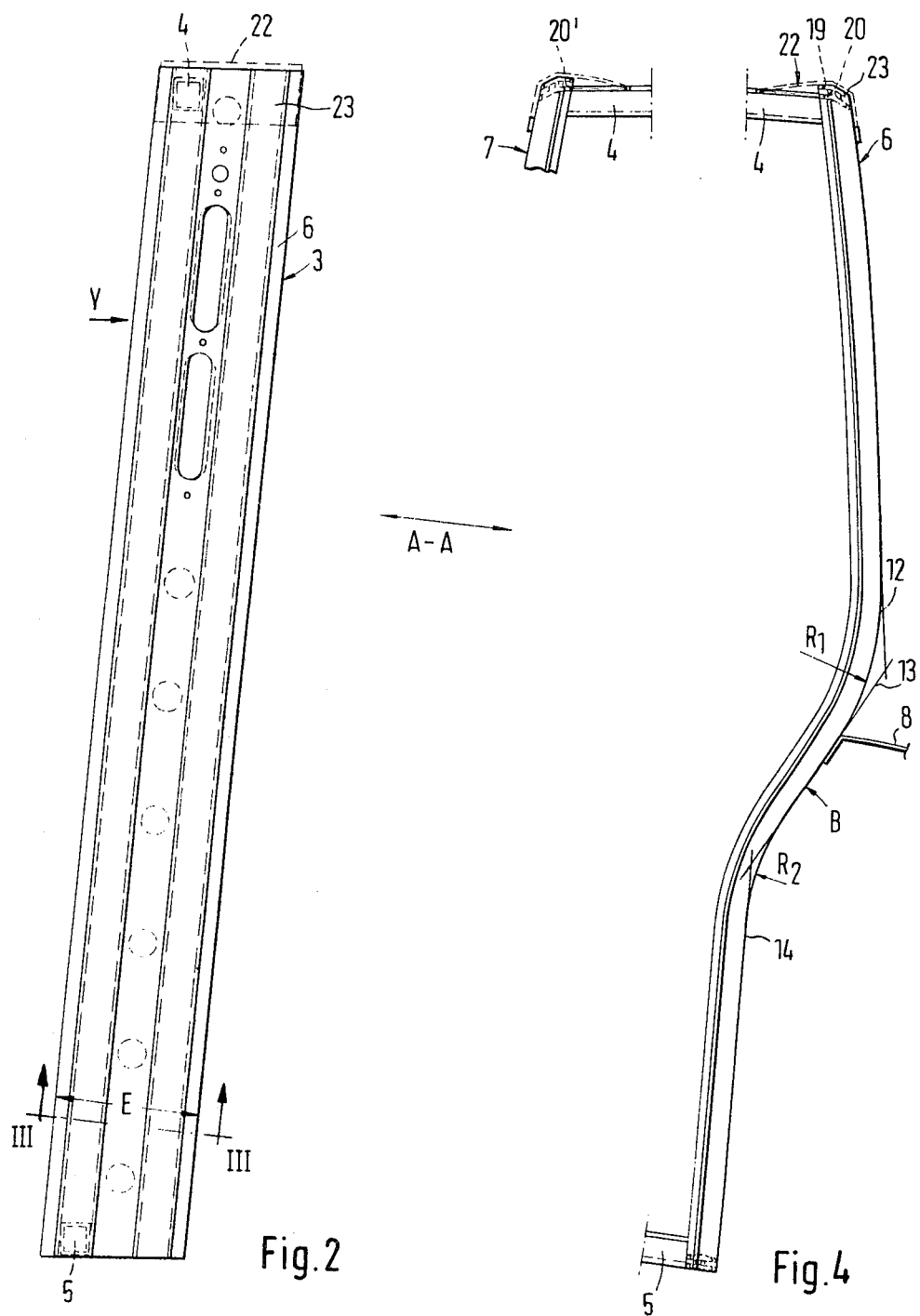

ROLL BAR FOR VEHICLES, ESPECIALLY MOTOR VEHICLES

BACKGROUND AND SUMMARY OF THE INVENTION

The invention relates to a roll bar for vehicles, especially motor vehicles, consisting of segments mounted on opposite sides of the body, said segments having shaped sections mounted vertically and being connected together by at least one cross member.

A known roll bar of the species cited hereinabove (U.S. Pat. No. 3,656,803) is provided on an agricultural vehicle and comprises two vertical hollow members, said members having a box-shaped cross section. Each hollow member is wedge-shaped along its length and is formed by two parts which are U-shaped in cross section, said parts being connected by welding at their short legs. The disadvantage of this design is that the hollow members can scarcely meet the stricter safety requirements of today, even in agricultural vehicles. Moreover, the hollow members run parallel to one another in a direction which is transverse with respect to the vehicle, therefore, inboard of the wheels, sharply limiting the driver's space and his visibility. If the hollow members were to be moved above the wheel but given the same cross-sectional design, in order thus to provide more space, for example, for a closed cab, a number of deep-drawing tools, which would have a disadvantageous effect upon cost, would be required for this purpose.

In another known roll bar (French Pat. No. 1,539,482) for passenger cars, it is true that excellent results are achieved with regard to strength by using two shaped deep-drawn parts assembled to form a supporting brace. The different tools for the different shaped parts entail a high tool cost which is not justified for example, in the case of short vehicle-production runs.

Accordingly, an object of the invention is to provide a roll bar for vehicles which reliably withstands the stresses which may develop and whose components, especially the vertical segments, can easily be manufactured while providing complete freedom of design.

This object is achieved according to a preferred embodiment of the invention by virtue of the fact that each segment comprises two elements with the same profile which withstand deformations that increase the section modulus, said elements being formed by rolled sections assembled to form a hollow member and connected to one another by welding, gluing, or the like. It is advantageous in this regard for each segment, as viewed in cross section, to comprise two tubular structures, joined to a common rib. The structures are arranged symmetrically with respect to one lengthwise and one transverse plane of the segment. The cross-sectional shape of the structures is rectangular. However, it is also possible to make them round or oval. If the segments include deformations in a direction transverse to the vehicle, it is advantageous to shape the elements in separate manufacturing operations. The deformations are formed by construction lines and radii. The segments are joined by one upper and one lower cross member, whereby the upper cross member is constituted by a section, preferably a tube, whose cross section is such that it joins one of the opposite structures of the segments in each case. A system of corner plates is provided to connect a segment with the tube, said corner plates connecting the two structures with the tube. The corner plate system comprises a part which is bent at an angle and covers the segment and the tube areawise. In addition, the segments maintain a constant width throughout their length, whereby a covering is mounted on the outside, said covering beginning at the level of the belt rail and extending upward, said covering having a wedge-shaped pattern.

The principal advantages achieved by the invention include the fact that rolled sections are used for the elements of the segments, said sections being manufactured in the same set of rolls on a roll-section manufacturing tool. This saves considerable tool cost even when the segments must be deformed in the direction transverse to the vehicle in order to meet design requirements. Each element is processed separately. Shaping the structures increases the section modulus of the segments producing high rigidity in the segments and consequently in the roll bar. This is supported even further by the cross members which link the segments and by the corner plate system.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a side elevation of a motor vehicle fitted with the roll bar according to the invention;

FIG. 2 is a detailed view of the roll bar according to FIG. 1;

FIG. 3 is a cross section along lines III—III in FIG. 2 on an enlarged scale;

FIG. 4 is a view looking in the direction of arrow Y in FIG. 2;

FIG. 5 is a view along line V—V in FIG. 1 on an enlarged scale; and

FIG. 6 is a partial sectional view of a modified roll bar.

DETAILED DESCRIPTION OF THE PREFERRED EMBODIMENT

Motor vehicle 1 comprises a body 2 with a roll bar 3. Roll bar 3 is formed by an upper cross member 4 and a lower cross member 5, said cross members being connected with opposite sides of segments 6 and 7 mounted on body 2. Segments 6 and 7 are mounted essentially vertically and are connected in their lower parts with a side wall, such as wheel well 8, specifically to the inside of the latter. Above an imaginary belt rail 9, segments 6 and 7 project freely. They may be connected in their upper parts by longitudinal members 10, which connect roll bar 3 with a windshield frame 11.

Segments 6 and 7 are deformed outwardly in the direction A—A transverse to the vehicle longitudinal direction in order to provide the largest possible space for passengers above wheel well 8. A transition zone B is formed by construction lines 12, 13, and 14 and radii R1 and R2. With regard to radii R1 and R2, it is noted that these radii need not have any specific value, it being sufficient that they produce oppositely facing curvatures.

Each segment 6 is formed by two elements 15 and 16, provided with deformations 17 and 18 which increase the section modulus, and are formed by rolled sections.

Elements 15 and 16 are the same, in other words, they are manufactured using the same set of rolls in a tool. In the embodiment, the left side of one element is made different from the right side, whereby the elements must be rotated through 180° to one another for assembly along planes C—C and D—D. If both elements are symmetrical, they may be assembled mirror-image fashion.

Transition zone B is provided for elements 15 and 16 in separate manufacturing operations, in other words, prior to assembly.

Deformations 17 and 18 form tubular structures 19 and 20 when elements 15 and 16 have been assembled, said structures 19 and 20 being mounted to a common rib 21 and located asymmetrically to lengthwise plane C—C and transverse plane D—D. Structures 19 and 20 are rectangular in the illustrated embodiment. However, they may be made round (FIG. 6) or oval if desired. The structures may be modified so that their sectional modulus is appropriate for the stresses which will develop.

Upper cross member 4 is formed by a tube. The cross section of this tube is dimensioned so that it connects one of the opposite structures 20, 20' with the other.

A corner plate system 22 is used to connect a segment 6 with the cross member. This system connects both structures 19 and 20 of a segment 6 with the tube.

The corner plate system 18 comprises a bent plate 23, mounted from above, and covering cross member 4 and segment 6 areawise.

Segments 6 and 7 have a constant width E over their length. A covering 24 is mounted on the outside of each segment, said covering extending upward to the roof, beginning approximately at the level of the belt rail. Covering 24 is made of plastic and is provided with a wedge-shaped design which tapers upward for stylistic reasons, and is defined by imaginary lines 25 and 26.

The invention may be used for roll bars on a wide variety of types of vehicles, such as agricultural vehicles, buses, truck-tractor cabins, passenger cars and the like.

While we have shown and described a single embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Roll bar assembly for protection of a vehicle occupant compartment under vehicle turn-over conditions, comprising segments mounted on opposite sides of a vehicle, said segments being mounted vertically and being connected together by at least one cross member, characterized by the fact that each segment comprises a pair of elements which have deformations, said deformations increasing the section modulus in a manner producing high rigidity, said elements having the same profile and being formed of rolled sections capable of manufacture in the same set of rolls on a roll-section manufacturing tool, and each pair of elements being connected together to form a hollow member which, in cross section comprises two tubular structures connected by a common rib, said tubular structures being located symmetrically with respect to a lengthwise plane and a transverse plan of the respective segment.

2. Roll bar assembly according to claim 1, wherein said pairs of elements are connected together by gluing.

3. Roll bar assembly according to claim 1, wherein said pairs of elements are connected together by welding.

4. Roll bar assembly according to claim 1, wherein the shape of the tubular structures is rectangular in cross section.

5. Roll bar assembly according to claim 1, wherein the structures are round in cross section.

6. Roll bar assembly according to claim 1, wherein said deformations extend in a direction transverse to the longitudinal direction of the vehicle.

7. Roll bar assembly according to claim 6, wherein the segments, when viewed in the vehicle longitudinal direction, comprise three straight portions, a first pair of which are separated by a curve of a first radius and a second pair of which are separated by a curve of a second radius, said curves being oppositely directed.

8. Roll bar assembly according to claim 1, wherein the segments are joined together by one lower and one upper cross member, the upper cross member being a tube connected to one of the tubular structures of said segments.

9. Roll bar assembly according to claim 6, wherein a corner plate system is provided to connect each segment with the cross member by joining both tubular structures of each segment with the cross member.

10. Roll bar assembly according to claim 9, wherein the corner plate system comprises a bent plate which covers an end surface of the respective segment and the cross member.

11. Roll bar assembly according to claim 1, characterized by the fact that the segments have a constant width for their entire length.

12. Roll bar assembly according to claim 11, wherein a cover is mounted on the outside of each segment beginning at the level of a belt rail and extending upward, said covering having a vertically wedge-shaped configuration.

13. Roll bar assembly according to claim 1, wherein the elements of each pair are unsymmetrical with respect to their respective longitudinal axis and are of the same shape, said elements of each pair being rotated 180° with respect to each other and joined with said deformations forming said tubular structures.

14. Roll bar assembly for protection of a vehicle occupant compartment under vehicle turn-over conditions, comprising segments mounted on opposite sides of a vehicle, said segments being mounted vertically and being connected together by at least one cross member, characterized by the fact that each segment comprises a pair of elements which have deformations, said deformations increasing the section modulus in a manner producing high rigidity, said elements having the same profile and being formed of rolled sections capable of manufacture in the same set of rolls on a roll-section manufacturing tool, and each pair of elements being connected together to form a hollow member, wherein a corner plate system is provided to connect each segment with the cross member by joining both tubular structures of each segment with the cross member, and wherein the corner plate system comprises a bent plate which covers an end surface of the respective segment and the cross member.

* * * * *